Patented July 28, 1925.

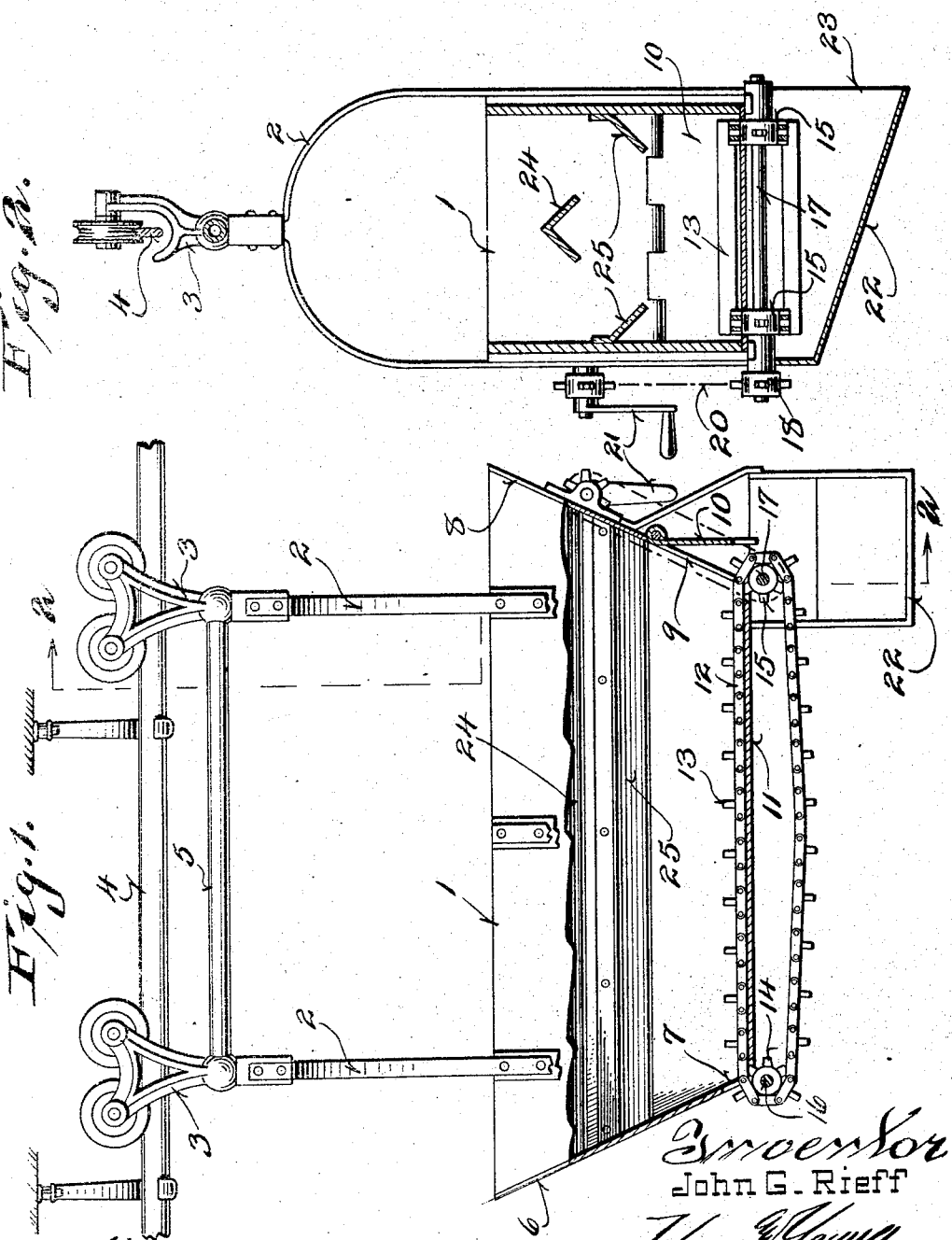

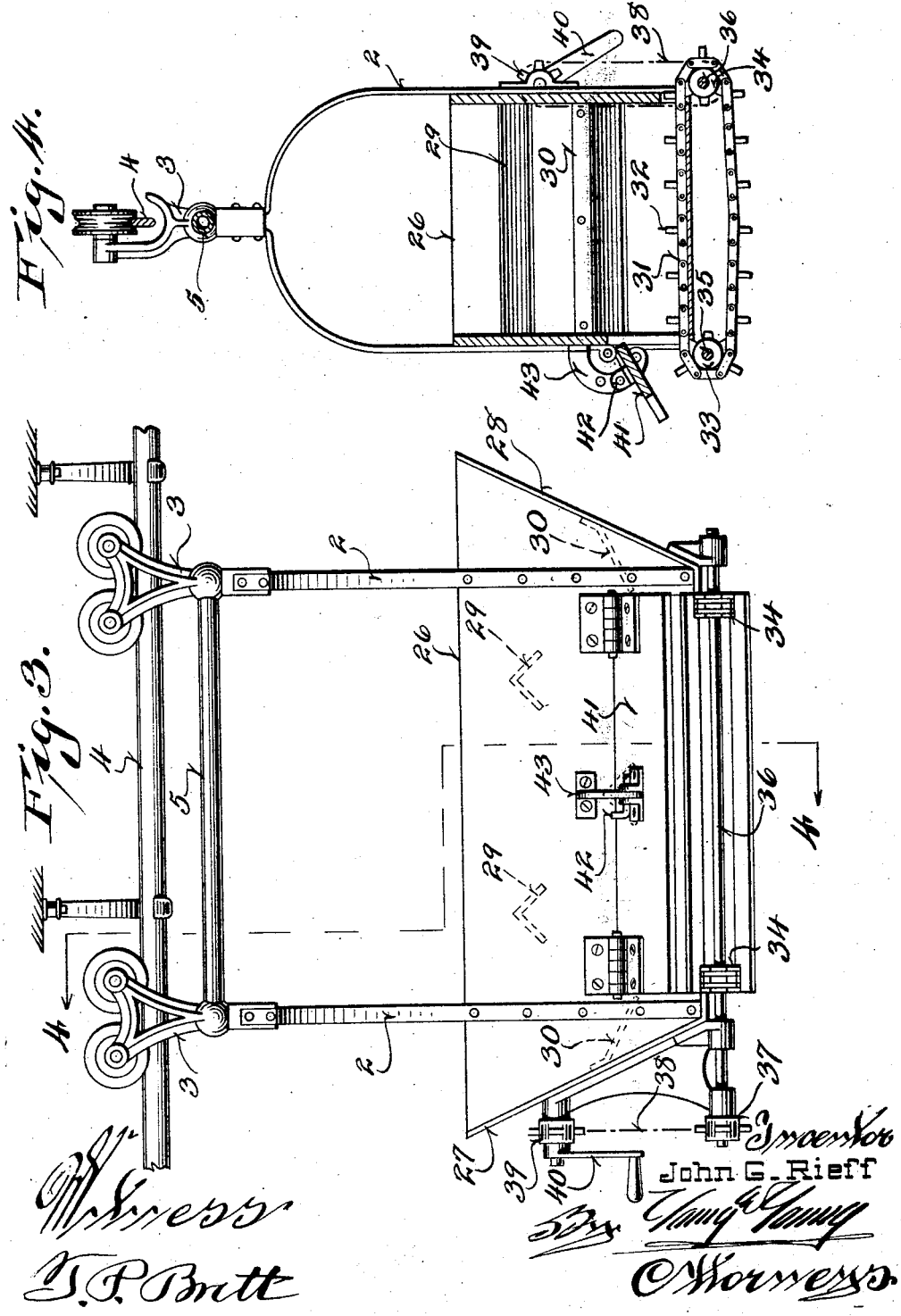

1,547,686

UNITED STATES PATENT OFFICE.

JOHN G. RIEFF, OF LONDON, WISCONSIN.

COMBINATION FEED CARRIER AND DISTRIBUTOR.

Application filed March 23, 1923. Serial No. 627,028.

*To all whom it may concern:*

Be it known that I, JOHN G. RIEFF, a citizen of the United States, and resident of London, in the county of Dane and State of Wisconsin, have invented certain new and useful Improvements in Combination Feed Carriers and Distributors; and I do hereby declare that the following is a full, clear, and exact description thereof.

This invention relates to feed carriers and is particularly directed to a combined feed carrier and distributor.

In distributing feed in barns difficulty has been had due to the fact that no adequate means were provided for not only carrying the feed to the desired point, but placing a portion thereof in the appropriate manger. The usual practice has been to carry the feed to the desired point by means of a conveyor or truck, and thereafter, in the case of a conveyor, lower it until it is within easy access of the attendant. The conveyor or truck is then partially emptied by shoveling the feed therefrom and depositing it in the manger. This is a highly unsatisfactory operation and is relatively slow and wasteful work—the feed is usually freely spilled over the floor of the barn or stable.

This invention is designed to overcome the above noted defects and objects of such invention are, therefore, to provide a combined feed carrier and distributor which will not only carry the feed to the desired point, but will distribute the exact amount into each of the several mangers; to provide a combined feed carrier and distributor which may be easily manipulated, which is rapid in its operation, and which is extremely efficient.

Further objects are to provide a combined feed carrier and distributor which may be readily installed in existing barns, which is cheap to manufacture, and which is of simple and sturdy construction.

Embodiments of the invention are shown in the accompanying drawings, in which:

Figure 1 is a side elevation, partly in section, of the combined feed carrier and distributor.

Figure 2 is a section on the line 2—2 of Figure 1.

Figure 3 is a side elevation of a further form of feed carrier and distributor, and Figure 4 is a section on the line 4—4 of Figure 3.

Figures 1 and 2, showing one form of the invention, will first be described. The feed carrier comprises a substantially rectangular compartment, but having downwardly sloping side and end walls. This carrier is adapted to be supported in any desired manner by means of an overhead trolley system, as shown, or, if desired, by means of a truck construction. In the form shown, the carrier is suspended by means of curved straps 2 secured to trucks 3 which travel upon suitably supported bars 4. If desired the trucks may be braced by a cross bar 5 to secure a more rigid construction. It is intended that the carrier shall travel along the row of mangers in close proximity thereto and shall be capable of assuming a position adjacent each of the several mangers so that it may discharge freely into the desired manger.

The carrier 1 has its rear end wall 6 provided with a relatively small transverse aperture 7 for a purpose hereinafter to appear, and the other end wall 8 is provided with a larger rectangular aperture 9 adapted to be partially covered by a suitably hinged flap 10, as illustrated in Figure 1. The bottom 11 of the carrier is closed and forms a race-way for a continuous chain or distributor 11, elements 12 of the chain, as shown, being provided with outwardly projecting paddles 13 arranged in regularly spaced order. Sprocket wheels 14 and 15 are mounted adjacent the ends of the carrier and are arranged in pairs upon transverse shafts 16 and 17. Either of the shafts may be the driving shaft and in the form shown the shaft 17 is equipped with an externally mounted sprocket 18 which is suitably connected with sprocket 19 by means of a chain 20. The sprocket 19 is rigidly mounted upon the hub of an operating crank 21 so that the distributing chain or conveyor may be operated manually externally of the carrier.

It is intended in the form shown that the feed shall discharge through the aperture 9 and a suitable discharge spout or chute 22, formed in the manner of a housing, is provided. This spout slopes downwardly and at one side is provided with an open end 23 so as to freely discharge into the manger.

In order to relieve the conveyor of the total weight of the superimposed feed, when the carrier 1 is filled, angle iron 24 may be positioned longitudinally of the carrier, as illustrated particularly in Figure 2, with its corner projecting upwardly. Further than this side flanges 25 may be provided which project inwardly of the side walls of the carrier 1 and aid in its partial supporting function. This construction insures the gradual feeding of the material downwardly upon the conveyor without at any time unnecessarily loading it.

Figures 3 and 4 showing the second form of the invention will now be described. In this form the same style of trucks and supporting mechanism for the carrier may be provided. However, the carrier 26 is differently formed from that previously described and comprises substantially the same general rectangular contour with downwardly sloping end walls 27 and 28. It is provided with relatively short, transverse angle irons 29 and with inwardly and downwardly directed flanges 30 carried by the end walls. Such last two sets of members correspond to the members 24 and 25 of the first form and function in the same manner. The lower portion of the carrier is equipped with a transverse conveyor 31, similarly provided with a plurality of links, certain of which carry outwardly projecting paddles 32. This conveyor is carried by pairs of sprocket wheels 33 and 34 mounted upon longitudinally extending shafts 35 and 36, respectively. One of the shafts, for instance, shaft 36, is provided with an external sprocket wheel 37 connected by means of the chain 38 with a corresponding sprocket wheel 39 mounted upon the hub of a crank 40.

In this form the flap 41 on the discharge side of the carrier is hingedly mounted and provided with an apertured ear 42 adapted to travel over an apertured arcuate member 43. The ear 42 and member 43 may be locked in any desired relative position by means of a pin slipped through their corresponding apertures so as to hold the flap 41 in any desired angular position.

It will be seen that a combined feeding carrier and distributor has been provided which may be filled and readily moved to the desired manger. The manger may thus be quickly filled by manipulating the operating crank and thereafter the carrier may be moved to the next manger. It will be seen, therefore, that this operation of filling the several mangers may be most expeditiously and rapidly performed and that a minimum of effort is required to accomplish this result.

It will further be seen that an extremely sturdy and serviceable device has been provided which may be operated in a simple manner.

Although the invention has been described in considerable detail, it is to be understood that it may take other forms from those shown and that therefore the invention is to be limited only as set forth in the appended claim.

I claim:—

A portably supported container having a bottom and an open end portion, an endless conveyor passing through said container and having a portion supported by said bottom, and a portion positioned wholly below said container, a plurality of load supporting deflecting plates positioned within said container above said conveyor and being arranged in a staggered relation directly over said conveyor, certain of said supporting members occupying a different vertical position from the remaining supporting members.

In testimony that I claim the foregoing I have hereunto set my hand at London, in the county of Dane and State of Wisconsin.

JOHN G. RIEFF.